Patented June 5, 1951

2,555,760

UNITED STATES PATENT OFFICE 2,555,760

RECOVERY OF STREPTOMYCIN FROM ORANGE II SALT

Peter P. Regna, West New York, N. J., and Isaiah A. Solomons, III, Jackson Heights, N. Y., assignors to Chas. Pfizer & Co., Inc., Brooklyn, N. Y., a corporation of New Jersey No Drawing. Application May 6, 1947, Serial No. 746,312

3 Claims. (Cl. 260—210)

This invention relates to the recovery of streptomycin from complex salts thereof, and it has for its object to provide a novel and improved process for this purpose.

Another object of the invention is to provide an efficient and economical method of separating streptomycin salts of high antibiotic activity from streptomycin dye salts.

Still another object is to separate streptomycin of high antibiotic activity from streptomycin-Orange II salts which may be precipitated directly from crude aqueous solutions of streptomycin, such as fermentation broths.

Various other objects and advantages will be apparent as the nature of the invention is more fully disclosed.

Streptomycin, an antibiotic produced by fermentation from selected strains of cultures of *Streptomyces griseus*, is a highly potent antibacterial agent which is effective against a wide variety of pathogenic organisms. Clinical indications for the use of streptomycin have been observed in urinary tract infections due to gram negative microorganisms, influenza bacillus meningitis, tracheobronchitis and pneumonia, tularemia, ophthalmic infections due to Ps. pyocyaneus, peritonitis due to gram negative organisms, and certain gram negative bacillary infections. Promising results have been obtained also in studies of tuberculosis.

It is known to adsorb streptomycin or its salts from solutions upon activated carbon, and to elute it therefrom with solvents adjusted to a pH below neutral, but this procedure yields streptomycin along with much extraneous material since many other substances are simultaneously adsorbed and eluted. For this reason this method gives a product of low potency. It is also possible to prepare streptomycin concentrates by adsorption on zeolite or ion-exchange resins. However, in removing the streptomycin from these adsorbents by sodium or potassium chlorides, the streptomycin becomes contaminated with considerable amounts of these salts which are difficult to remove, and even after separation of the inorganic salts gives concentrates with a low streptomycin potency.

In our copending application, Serial No. 743,206, filed April 22, 1947, we have disclosed that streptomycin is almost quantitatively precipitated from fermentation broths, in the form of a dye salt, by combining the streptomycin in the growth medium with sodium-p-(2-hydroxy-1-naphthylazo)-benzene sulfonate, a dye which is also known as Orange II (Color Index #151).

The present invention relates to a method of recovering streptomycin of high antibiotic activity from streptomycin salts of -p-(2-hydroxy-1-naphthylazo)-benzene sulfonic acid, which comprises mixing said dye salt with a liquid which is a solvent for streptomycin halides, and reacting said mixture with a metal halide to precipitate a metal salt of $\beta$-naphtholazobenzene-p-sulphonate and form a solution of a streptomycin halide.

Our preferred method of accomplishing the metathesis reaction of streptomycin-Orange II into its two components is to suspend the streptomycin-dye in alcohols, ethers of ethylene glycol ("cellosolves"), water or mixtures of water with acetone, alcohols and ethers of ethylene glycol. To the mixture is then added barium chloride, so as to precipitate the barium salt of Orange II and leave the soluble streptomycin trihydrochloride in solution. Instead, however, of using barium chloride, other alkaline earth halides, such as, calcium, strontium and magnesium, or other metal halides, such as, zinc, cadmium, lead, etc. can be employed. The necessary conditions are that the streptomycin hydrohalide formed in the reaction is soluble in the alcohol, water, or other solvent, and that the metal-Orange II salt is more insoluble than streptomycin-Orange II. The metathesis reaction can be carried out even at elevated temperatures as hereinafter described.

If it is desired to recover the streptomycin as the sulfate, from a solution of the streptomycin hydrohalide, this can be accomplished by the addition of triethylamine sulfate, in which the streptomycin sulfate is removed by filtration, leaving the triethylamine hydrohalide in solution. Any soluble amine sulfate may be employed in the precipitation (see our copending application, Serial No. 674,394, filed June 4, 1946, now Patent No. 2,537,941).

The microbiological assays on the streptomycin were carried out using *Escherichia coli* and *Bacillus subtilis* similar to those employed for penicillin assays. The *B. subtilis* plate assay is carried out by the method of Schmidt and Moyer (J. Bact., vol. 47, p. 199 (1944)), and the *E. coli* turbidimetric assay by the procedure of Mc-Mahan (J. Biol. Chem., vol. 153, p. 249 (1944)).

Other break-up procedures in which the streptomycin-Orange II salt is first partially dissolved in acetone-water mixtures, methanol-water mixtures, and other solvent mixtures, such as water-propanol, water-methyl cellosolve, etc., take place, as described in the following examples.

The conditions and situations described herein prevail in the case of streptomycin-Orange II salts which have been obtained from fermentation broths, from eluates of adsorbents and from solutions of partially-purified streptomycin.

Example 1

One hundred liters of a filtered streptomycin fermentation broth (120 mcg./ml.) was adjusted to pH 5.5 with sulfuric acid and to it was added 700 g. of "supercel" (a diatomaceous earth filteraid) and 120 g. of Orange II. The large amount of filter aid is not necessary for purposes of aiding the filtration, but is a means of keeping the precipitate well-dispersed in the subsequent conversion of the streptomycin-Orange II salt to streptomycin trihydrochloride. The mixture was stirred for one-half hour, filtered and the filtrate, containing 10 mcg./ml., was discarded. The streptomycin-Orange II cake was partially dried on a Buechner funnel and was then divided into a number of portions from which the streptomycin was recovered as described below as well as in Examples 2 to 4.

A portion of the wet streptomycin-Orange II cake (50 g.) was suspended in 150 ml. of methanol, containing 3.5 g. of barium chloride. The suspension was stirred at room temperature for two hours, and the precipitated barium salt of Orange II was filtered. The filtrate contained 93% of the streptomycin in the streptomycin-Orange II cake. The methanol was evaporated in vacuo, and the aqueous residue was filtered and dried. After removing the excess barium chloride, the dried material when assayed against the Food and Drug Administration working standard gave an average potency of 520 mcg./mg. by the *B. subtilis* agar plate and the *E. coli* turbidimetric methods.

In place of barium chloride, equivalent amounts of calcium chloride or strontium chloride can be used. In addition, the corresponding alkaline-earth bromides may be employed yielding streptomycin trihydrobromide and the insoluble alkaline-earth salts of Orange II. Furthermore, heavy metal halides, such as aluminum chloride, ferric chloride, zinc bromide, manganese chloride, copper chloride, etc., are also suitable for this purpose. The conversion can be carried out, also, at elevated temperature, thereby greatly shortening the reaction time.

Example 2

Fifty grams of the wet streptomycin-Orange II cake, obtained as described in Example 1, was suspended in 150 ml. of methanol, containing 4 g. of strontium chloride, and stirred for three hours. The strontium-Orange II salt was filtered, and the filtrate was found to contain 95% of the streptomycin. To this filtrate was added sufficient triethylamine sulfate to precipitate streptomycin sulfate and strontium sulfate. The combined precipitates were suspended in water, and an equal amount of methanol was slowly added with stirring. The precipitated strontium sulfate was filtered. The filtrate was then poured into a large volume of methanol, and the precipitated streptomycin sulfate was filtered and dried; the dried material when assayed against the Food and Drug Administration working standard gave an average potency of 500 mcg./mg. by the *B. subtilis* agar plate and the *E. coli* turbidimetric methods.

Example 3

Fifty grams of the wet streptomycin-Orange II cake, obtained as described in Example 1, was suspended in 300 ml. of a 1:1 acetone-water mixture, and treated with 3.5 g. of barium chloride dissolved in water. The precipitated barium-Orange II was further increased on slight evaporation of the acetone. The barium-Orange II was then filtered and the filtrate was evaporated, almost to dryness, in vacuo. The residue was triturated with methanol, and the excess barium chloride was filtered. The streptomycin trihydrochloride was evaporated to dryness and further dried over barium oxide; the dried material when assayed against the Food and Drug Administration working standard gave an average potency of 530 mcg./mg. by the *B. subtilis* agar plate and the *E. coli* turbidimetric methods.

Example 4

Fifty grams of the wet streptomycin-Orange II cake, obtained as described in Example 1, was suspended in 200 ml. of 1:1 acetone-water mixture and treated with 3.5 g. of calcium chloride dissolved in water. The amount of precipitated calcium-Orange II was further increased on slight evaporation of the acetone. The calcium-Orange II was then filtered, and the filtrate was evaporated in vacuo to a small volume. The solution was then poured into methanol, containing an excess of triethylamine sulfate, and the precipitated streptomycin sulfate and calcium sulfate were removed by filtration. The combined precipitates were suspended in water, and an equal amount of methanol was slowly added with stirring. The precipitated calcium sulfate was filtered. The filtrate was then poured into a large volume of methanol, and the precipitated streptomycin sulfate was filtered and dried over barium oxide; the dried material when assayed against the Food and Drug Administration working standard gave an average potency of 520 mcg./mg. by the *B. subtilis* agar plate and the *E. coli* turbidimetric methods.

Example 5

To four liters of a filtered streptomycin fermentation broth (100 mcg./ml.) at pH 6 was added 40 g. of carbon (Norite A), stirred one hour and filtered over a "supercel" pre-coated filter. The carbon adsorbate was suspended in 300 ml. of 0.1 N hydrochloric acid and stirred for one-half hour. The mixture was then filtered, and the clear filtrate was neutralized with sodium hydroxide to pH 5.5 and re-filtered. Several of the above adsorption experiments were combined until 2500 ml. were accumulated containing 1,450,000 mcg. of streptomycin. To the solution at pH 5.5 was added 6 g. of Orange II (approximately 1 g./250,000 mcg.) dissolved in 50 ml. of water. After standing several hours about 20 g. of "supercel" was added and the whole precipitate was filtered. The filtrate contained 25 mcg./ml. (4.3%). The precipitate was suck dried on a Buechner funnel and suspended in 500 ml. of methanol (sufficient to make the final solution at least 90% with respect to methanol) containing 1 g. of calcium chloride. The suspension was stirred for several hours in order to convert the Orange II to its calcium salt and the streptomycin to the trihydrochloride. The calcium salt was filtered and the filtrate found to contain 1,360,000 mcg. (94%). To the filtrate was added sufficient triethylamine sulfate to precipitate streptomycin sulfate and calcium sulfate. On filtering the precipitate, the filtrate was found to contain 19,000 mcg. (1.5%). The precipitate was dissolved in 65 ml. of water, and an equal volume of methanol was slowly added with stirring; the precipitated calcium sulfate was filtered. The filtrate was then poured into 800 ml. of methanol. The precipitated streptomycin sulfate was filtered and dried; the dried material when assayed against the Food and Drug Administration working standard gave an average potency of 538 mcg./mg. by the *B. subtilis* agar plate and the *E. coli* turbidimetric methods.

The invention claimed is:

1. A process which comprises suspending a streptomycin salt of p-(2-hydroxy-1-naphthylazo)-benzene sulfonic acid in a solvent which is capable of dissolving streptomycin hydrochloride, adding a solution of barium chloride in said solvent in excess of the amount required to precipitate all of the p-(2-hydroxy-1-naphthylazo)-benzene sulfonic acid as an insoluble barium salt of p-(2-hydroxy-1-naphthylazo)-benzene sulfonic acid and to form a solution of streptomycin hydrochloride, removing the excess of said barium chloride remaining in the solution of the streptomycin hydrochloride and isolating the streptomycin as a metal-free, water-soluble salt of high antibiotic potency.

2. The process of claim 1 in which the solvent is aqueous methanol.

3. The process of claim 1, in which the solvent is aqueous acetone.

PETER P. REGNA.
ISAIAH A. SOLOMONS, III.

REFERENCES CITED

The following references are of record in the file of this patent:

UNITED STATES PATENTS

| Number | Name | Date |
|---|---|---|
| 2,446,102 | Peck | July 27, 1948 |
| 2,462,175 | Folkers | Feb. 22, 1949 |

OTHER REFERENCES

Jour. Amer. Chem. Soc.—vol. 68, pp. 772, 776—May (1946).

Kuehl—Jour. Amer. Chem. Soc.—vol. 68—pp. 1460–62, (1946) August.

Peck et al.—Jour. Amer. Chem. Soc.—vol. 68—pp. 772–776, (1946).

Partington Textbook on Inorganic Chemistry, 5th Edition, pp. 309–310 (1937), 2 pages.

Kuehl et al.: Science; vol. 102 (1945), pp. 34–35, 2 pages.

Peck et al.: J. A. C. S.; vol. 67 (1945), pp. 1866–1867, 2 pages.

Carter et al.: J. Biol. Chem.; vol. 160 (1945), pp. 338–339, 2 pages.